United States Patent [19]

Tuchiya et al.

[11] Patent Number: 5,068,735

[45] Date of Patent: Nov. 26, 1991

[54] SYSTEM FOR CONTROLLING THE AIMING DIRECTION, FOCUS, ZOOMING, AND/OR POSITION OF A TELEVISION CAMERA

[75] Inventors: Kazumichi Tuchiya; Nobuhara Nagashima; Masayoshi Wasada; Akihiro Suzuki, all of Saitama, Japan

[73] Assignee: Fuji Photo Optical Co., Ltd., Oomiya, Japan

[21] Appl. No.: 566,736

[22] Filed: Aug. 13, 1990

[30] Foreign Application Priority Data

Aug. 22, 1989 [JP] Japan ................................ 1-215358

[51] Int. Cl.⁵ .............................................. H04N 5/30
[52] U.S. Cl. ..................................... 358/209; 358/210; 358/185; 358/108; 364/559; 364/167.01
[58] Field of Search ............ 358/209, 210, 185, 194.1, 358/227, 125, 126, 108; 354/195.1, 195.11, 195.12, 94; 364/525, 559, 167.01

[56] References Cited

U.S. PATENT DOCUMENTS

| | | | |
|---|---|---|---|
| 4,123,782 | 10/1978 | Kitahara | 358/185 |
| 4,244,006 | 1/1981 | Kitahara | 358/210 |
| 4,893,202 | 1/1990 | Smith | 358/185 |
| 4,974,088 | 11/1990 | Sasaki | 358/210 |

*Primary Examiner*—James J. Groody
*Assistant Examiner*—Sherrie Hsia
*Attorney, Agent, or Firm*—Jordan and Hamburg

[57] ABSTRACT

A system for controlling the aiming direction, focus, zooming and/or position of a television camera comprises servo-mechanisms for controlling the tilting, panning and lifting of a panning head on which a television camera is mounted, and servo-mechanisms for controlling the focusing, zooming of the television camera. A microcomputer is provided in a control box for modifying the setting speeds for tilting, panning, lifting and focusing by the value of adjustment for zooming.

2 Claims, 7 Drawing Sheets ically illustrating the

SYSTEM FOR CONTROLLING THE AIMING DIRECTION, FOCUS, ZOOMING, AND/OR POSITION OF A TELEVISION CAMERA

BACKGROUND OF THE INVENTION

The present invention relates to a television (will be referred to as "TV" hereinafter) camera controller for changing the directions, position or focal distance of a TV camera.

Description of the Prior Art

Conventionally, a method for shooting while remote-controlling the focusing (will be referred to as "F motion" herebelow) of each of plural TV cameras and the zooming (will be referred to as "Z motion" herebelow) has been adopted in a relayed broadcasting from an outdoor spot, etc. Also a method for remote-control of the panning (will be referred to as "P motion" herebelow) and tilting (will be referred to as "T motion" herebelow) of the panning head on which the TV camera is mounted has been proposed.

Such F, Z, P and T motion of the TV camera are usually controlled by controls and a control lever (both will be generically referred to as "control means" herebelow) on the control box provided in the control room or the like.

The shooting manners by which plural TV camera are as remote-controlled generally include two kinds. Namely, in the first kind of shooting manner, the camera operator catches up an object always moving while controlling the control means on the control box, as in a relayed broadcasting of a concert or sports such as golf play, baseball game, etc. In the second manner, the shooting of a plurality of objects with less motion is done in a predetermined procedure, as in TV news program, talk program, educational program, etc. For the second manner of shooting the F, Z, P and T motions for each of the scenes can be previously written in a microcomputer incorporated in the control box and the TV cameras be controlled based on these preset values in an actual shooting while manually operating the control means on the control box only for fine adjustment of the preset values.

However, the above-mentioned two manners of shooting require different control means, respectively, on the control box. Namely, the first manner of shooting requires that each of the F, Z, P and T motions of the TV cameras should be quick and large with a small adjustment of the corresponding control means, while the second manner requires that each of such motions should be done slow and small with a large adjustment of the control means.

Hence, the response of each control means is usually set to an intermediate value so that both manners of shooting can be accommodated.

Since the response of each control means on the control box is set to an intermediate value as mentioned above, when the F, Z, P and T motions are remote-controlled with the TV camera zoomed up, the reproduced image change will be effected largely with a small adjustments of their corresponding control means; that is, it is difficult to operate the TV camera.

SUMMARY OF THE INVENTION

The present invention has an object to overcome the above-mentioned drawbacks of the conventional TV camera controller by providing a TV camera controller which permits slow adjustment of F, P and T motions with a large value of zooming so as to prevent the rapid change of a reproduced image and which permits an easy remote-control of the TV camera even with a zoom-up.

The above-mentioned object can be attained by providing a TV camera controller according to the present invention comprising, as shown in FIG. 1, a control means 11 for changing the vertical and horizontal orientations or position or the focal distance of the TV camera, a means 12 for setting a value with which the TV camera is zoomed, a means 13 for setting a value of speed at which the direction, position or focal distance of the TV camera is to be changed, a control means 14 for changing the direction, position or focal distance of the TV camera at the value of speed set with the speed setting means 13 and a means 15 for transmitting to the drive mechanism of the TV camera a control signal set by the control means 14.

In the TV camera controller according to the present invention, when the F, P and T motion of the TV camera is to be effected or when the movement of the TV camera in either a vertical or horizontal direction is to be remote-controlled, the control means 11 is first adjusted appropriately and this value of adjustment of the control means 11 is supplied to the input of the speed setting means 13.

On the other hand, when a value of zooming of the TV camera is set by the zooming-value setting means 12, the zooming-value is supplied to the speed setting means 13.

In the speed setting means 13, the zooming value supplied from the zooming-value setting means 12 and the value of adjustment of the control means 11 are used to set a speed of F, P or T motion of the TV camera or a speed at which the TV camera is to be moved vertically or horizontally.

According to the moving speed set in the speed setting means 13, the control means 14 drives the TV camera or the panning head on which this TV camera is mounted, by means of the drive mechanism to which the control signal set by the control means 14 is transmitted by the transmission means 15, thereby permitting the F, P or T motion of the TV camera.

Thus, since the response of the control means 11 is changed correspondingly to a supplied zooming value because the F, P or T motion or vertical or horizontal movement is controlled at a different speed correspondingly to the zooming value even with a same value of adjustment of the control means, so the control means 11 on the control box can be operated extremely easily.

DETAILED DESCRIPTION OF THE PREFERRED EMBODIMENTS

Figure 1:
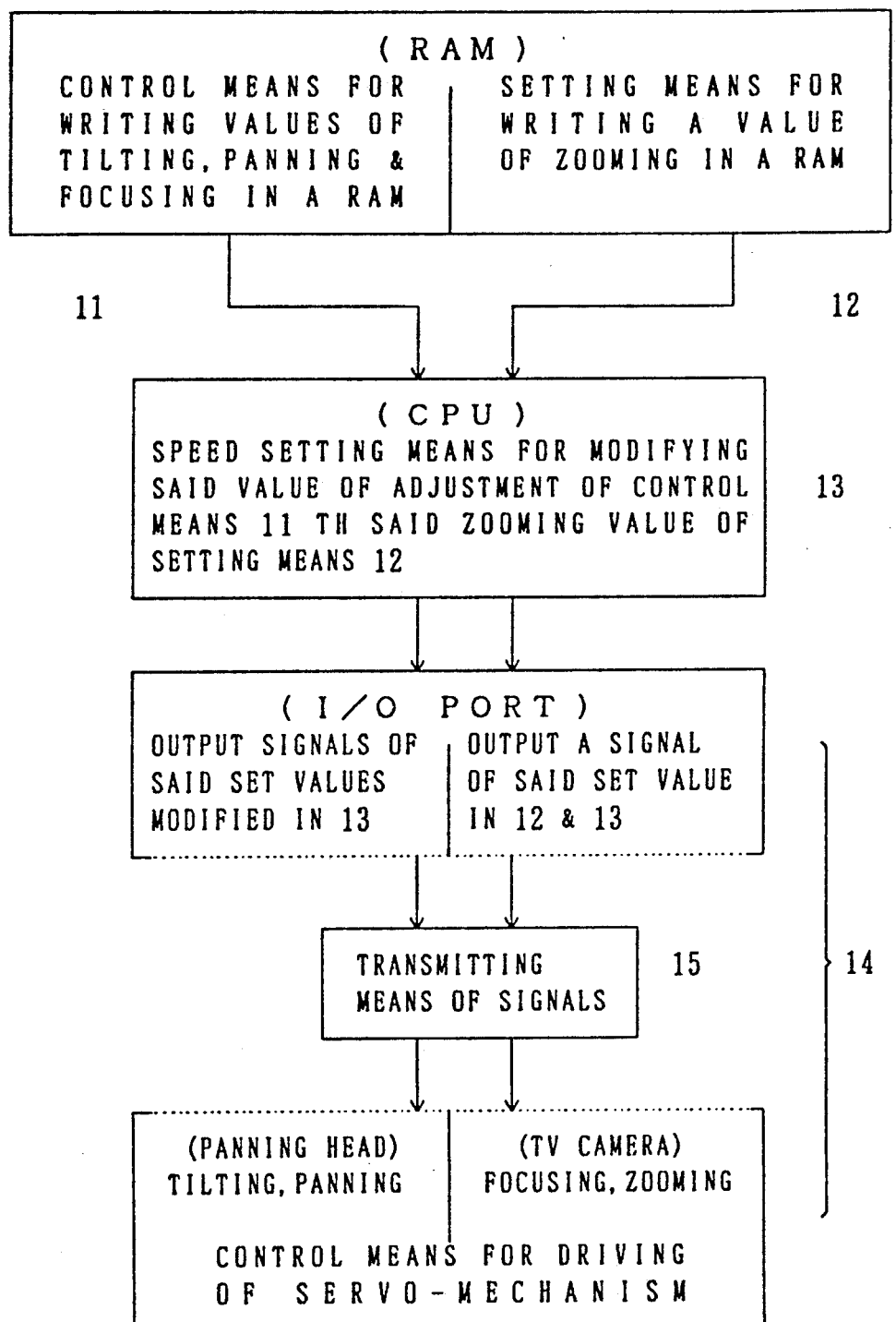
FIG. 1 is a block diagram schematically illustrating each of the means comprising the TV camera controller according to the present invention.
Figure 2:
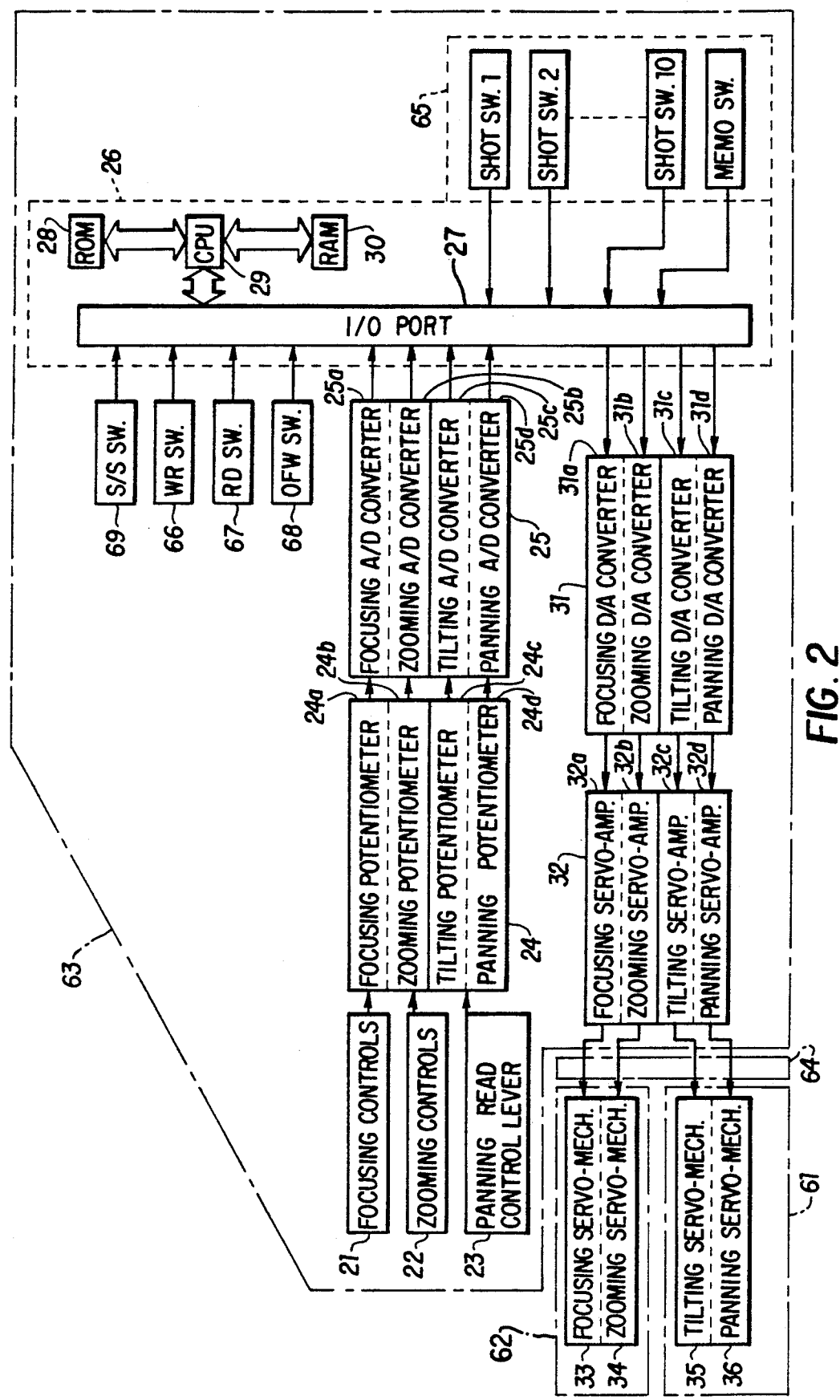
FIG. 2 is also a block diagram showing the circuit configuration of an embodiment of the TV camera controller according to the present invention.
Figure 3:
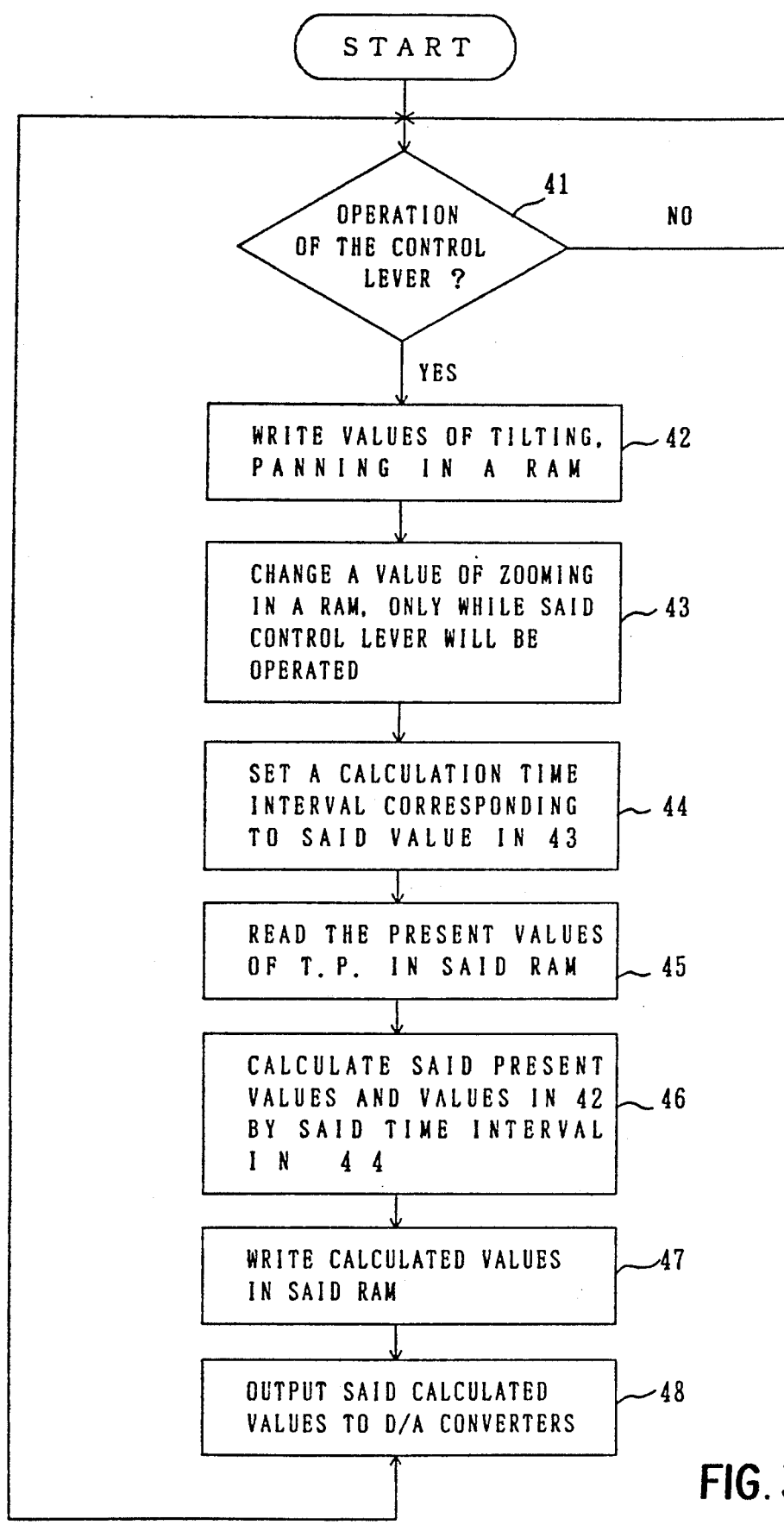
FIG. 3 is a functional flow chart of the first embodiment of the present invention.
Figure 6:
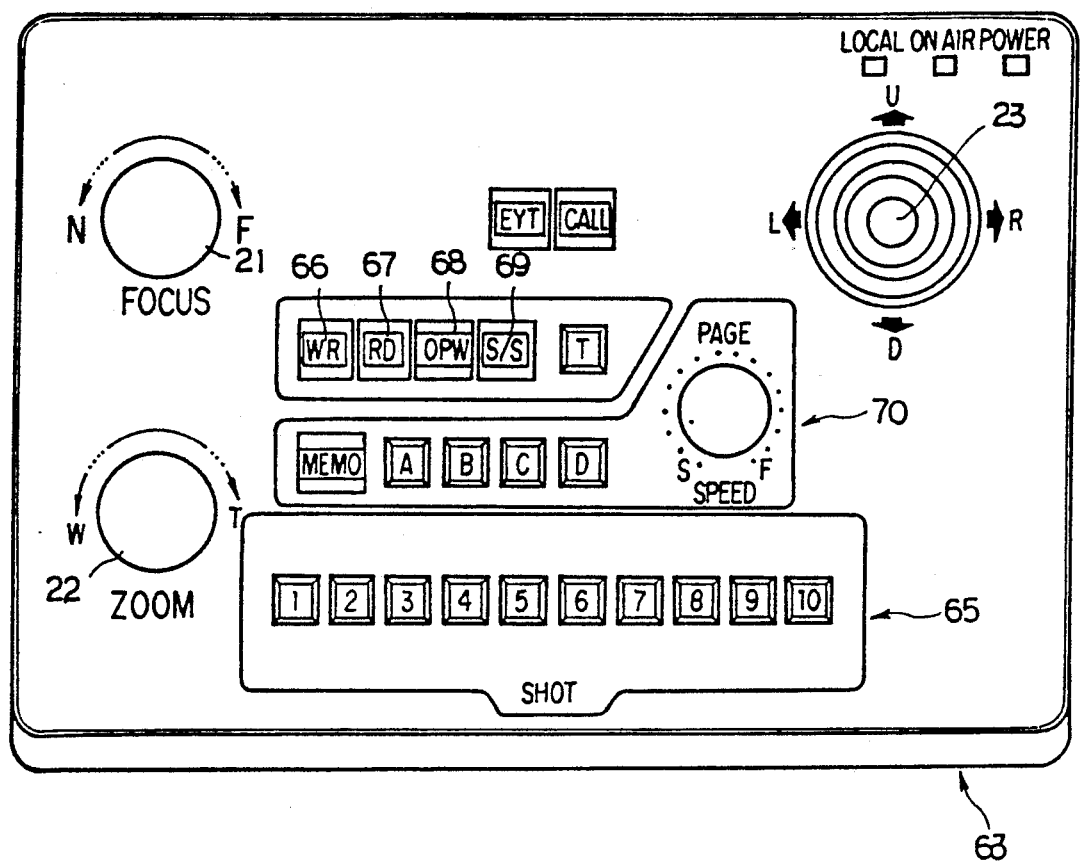
FIG. 6 is a plan view of the control box adopted in the first embodiment.
Figure 7:
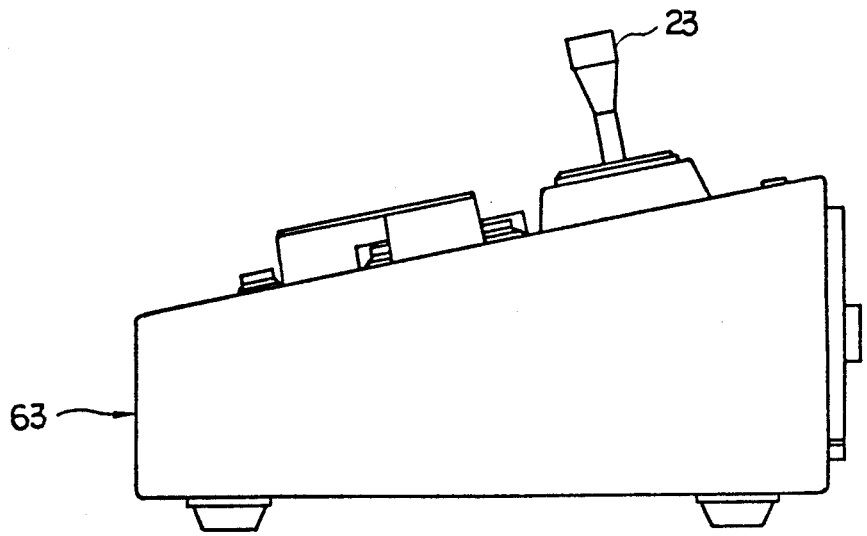
FIG. 7 is a side elevation of the control box shown in FIG. 6.

FIG. 2 is a block diagram showing the circuit configuration of the embodiment of the TV camera controller according to the present invention. FIG. 3 is a functional flow chart of the first embodiment. FIG. 6 is a plan view of the control box used in the embodiment in consideration. FIG. 7 is a side elevation of the control box.

As seen from FIGS. 2, 3, 5, 6 and 7, the TV camera controller according to the first embodiment comprises a panning head driving servo-mechanism provided in a panning head 61, a lens driving servo-mechanism provided for a lens 62a of a TV camera 62, and a control box 63 which provides a remote-control of the panning head driving servo-mechanism and lens driving servo-mechanism. Note that the reference numeral 64 indicates a cord which provides an electrical connection among the control box 63, panning head driving servo-mechanism and lens driving servo-mechanism.

Figure 8:
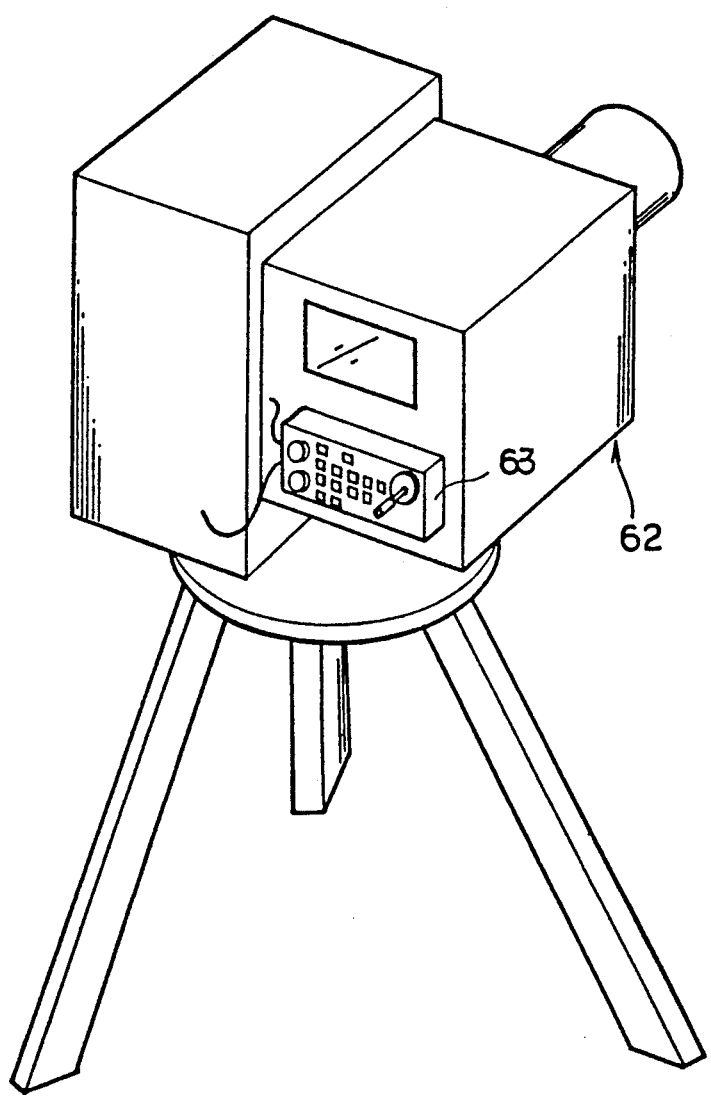
FIG. 8 is a perspective view showing a variant in configuration of the TV camera controller according to the present invention.

In this embodiment, the panning head driving servo-mechanism and lens driving servo-mechanism are operated under the remote control. As shown in FIG. 8, however, the control box 63 may be mounted directly on the TV camera 62, and furthermore, a transmission line may be formed by a optical-fiber or radio communications system.

The panning head driving servo-mechanism is activated with a control signal from the control circuit 26, and comprises a tilting servo-mechanism 35 by which the panning head 61, is pivoted vertically, a panning servo-mechanism 36 by which the panning head 61 is pivoted horizontally, a tilting servo amplifier 32c for the tilting servo-mechanism 35 and a panning servo amplifier 32d for the panning servo-mechanism 36. Also, the control box 63 has a control lever 23 which is manually operated by the operator such as camera man to activate the tilting servo-mechanism 35 and the panning servo-mechanism 36 as necessary.

The lens driving servo-mechanism is also activated with a control signal from the control circuit, and comprises a focusing servo-mechanism 33 and a zooming servo-mechanism 34 provided for the lens 62a of the TV camera 62, a focusing servo amplifier 32a for the focusing servo-mechanism 33 and a zooming servo amplifier 32b for the zooming servo-mechanism 34. Also, the control box 63 is provided with a focusing control 21 and a zooming control 22 which are manually operated by the operator to activate the focusing servo-mechanism 33 and zooming servo-mechanism 34, respectively, as necessary.

The focusing control 21 is operatively coupled with a focusing potentiometer 24a which converts a value of adjustment of the focusing control 21 into an electric signal. Similarly, the zooming control 22 is operatively coupled to a zooming potentiometer 24b and the control lever 23 is operatively coupled to a tilting potentiometer 24c which detects the value of vertical adjustment of the control lever 23 and a panning potentiometer 24d which detects the value of horizontal adjustment of the control lever 23, respectively.

The output of each of the potentiometers 24a, 24b, 24c and 24d is connected to an A/D converter 25 which has 4 systems of signal circuit. Namely, the output of the focusing potentiometer 24a is connected to the input of a focusing A/D converter 25a, the output of the zooming potentiometer 24b is connected to the input of a zooming A/D converter 25b, the output of the tilting potentiometer 24c is connected to the input of the tilting A/D converter 25c, and the output of the panning potentiometer 24d is connected to the input of the panning A/D converter 25d.

The four systems of the signal circuit of the A/D converter 25 are connected at the outputs thereof to the inputs of an I/O port 27 of the microcomputer 26.

The micro computer 26 has a central processing unit (CPU) 29, a read-only memory (ROM) 28, random-access memory (RAM) 30 and the I/O port 27. According to a program written in the ROM 28, the CPU 29 reads signals from the I/O port 27 and RAM 30 and processes the signals which will be delivered at the I/O port 27, while writing a predetermined data into the RAM 30, thereby controlling the operation of the entire TV camera controller according to this embodiment.

There are connected to the outputs of the I/O port 27 a focusing D/A converter 31a, zooming D/A converter 31b, tilting D/A converter 31c and a panning D/A converter 31d, respectively, which convert each of the control signals into an analog signal for control of the focusing mechanism 33, zooming mechanism 34, tilting mechanism 35 and panning mechanism 36, respectively. The outputs of the focusing D/A converter 31a, zooming D/A converter 31b, tilting D/A converter 31c and panning D/A converter 31d are connected to the inputs of the focusing servo amplifier 32a, zooming servo amplifier 32b, tilting servo amplifier 32c and panning servo amplifier 32d, respectively.

Note that the control box 63 in this embodiment is provided with switches 65 to 69 and a shot box panel 70, so that F, Z, P and T motions for each scene in the second manner of shooting are previously written in the microcomputer and each of intended shots is automatically. The reference numeral 65 indicates a shot button panel on which the first to the tenth shot buttons are provided for a maximum of 10 shots. The maximum permissible time of operation for each shot button is set to 20 sec. The reference numeral 66 indicates a write (WR) switch, 67 a reproduction (RD) switch, 68 a focus write (OFW) switch, and 69 a start/stop (S/S) switch. F, Z, P and T motions in each scene are written beforehand by operating these switches and for reproduction of each shot, the values of these motions are fine-adjusted by manually operating the switches as necessary.

Next, the operation of the TV camera controller according to this embodiment will be described with reference to the functional flow chart in FIG. 3. This functional flow chart includes the operations of the TV camera controller, which will take place when the control lever 23 is operated by the operator. However, the TV camera controller according to the present invention will work in nearly the same way even when the focusing controls 21 is operated. The control lever 23 is of such a type that the tilting servo-mechanism 35 or panning servo-mechanism 36 will act in proportion with a tilting angle of the control lever 23.

Assume that the power supply is turned on and the TV camera controller according to the present invention is in the manual mode.

When the control lever 23 is operated, an electric signal (voltage) proportional to the value of adjustment (that is, a tilting angle) of the control lever 23 is delivered at the tilting potentiometer 24c or panning potentiometer 24d, converted into a digital signal in the tilting A/D converter 25c or panning A/D converter 25d and supplied to the control circuit 26 from the I/O port 27. The CPU 29 receives this digital signal through the I/O port 27, determines that the control lever 23 is operated (at step 41), and writes into a predetermined address in the RAM 30 this digital signal indicative of the value of adjustment of the control lever 23.

Next, a value of zooming of the zoom lens displaced as the zooming controls 22 is operated is subject to an addition or subtraction with respect to the preset value of zooming in the RAM 30 correspondingly to the value of adjustment supplied to the RAM 30 to change the value of zooming (at step 43). In this case, the value of zooming will not be changed unless the zooming controls 22 is operated.

The CPU 29 reads from the RAM 30 a time interval for calculation corresponding to the above-mentioned value of zooming and sets it (at step 44).

Further, the CPU 29 reads from a predetermined address of the RAM 30 a data indicative of the present orientation of the TV camera 62 or panning head 61 (a value at the preceding turn-off of the power supply when the power supply is turned on) (at step 45), and after the time interval set at the preceding step 44 passes, it adds or subtracts the above-mentioned value of adjustment only once to or from the above-mentioned present value of orientation (for example, the rightward P motion is additive, the leftward P motion is subtractive) (at step 46).

The CPU 29 stores the result of the addition or subtraction at the address of the RAM 30 where the present value of orientation is written (namely, the result replaces the data of the present value of orientation) (at step 47), and delivers it to the panning D/A converter (at step 48) to operate the tilting servo-mechanism 35 or panning servo-mechanism 36 for an amount corresponding to the value of adjustment of the control lever 23 by means of the tilting servo amplifier 32c or panning servo amplefier 32d.

With the above-mentioned operations and after the time interval set correspondingly to the value of zooming has passed, the panning head 61 will start a P or T motion for an amount corresponding to the value of adjustment of the control lever 23 after operated by the operator.

Then, the operation returns to the step 41 where it is judges whether or not the control lever 23 is being still operated. If it is decided that the control lever 23 is being operated, similar operations will be continuously done. Namely, only while the control lever 23 is continuously operated, the data corresponding to the value of adjustment of the control lever 23 is added to or subtracted at a time interval corresponding to the value of zooming to or from the present value which is sequentially changed so that the panning head driving servo-mechanism continuously operates until a position corresponding to the result of the addition or subtraction is reached, whereby the panning head 61 is continuously changed in orientation at a speed corresponding to the value of zooming.

Thus, when the operator resets the control lever 23 to the neutral position after the panning head 61 has effected a P or T motion up to the desired position, the panning heat driving mechanism stops moving.

Figure 4:
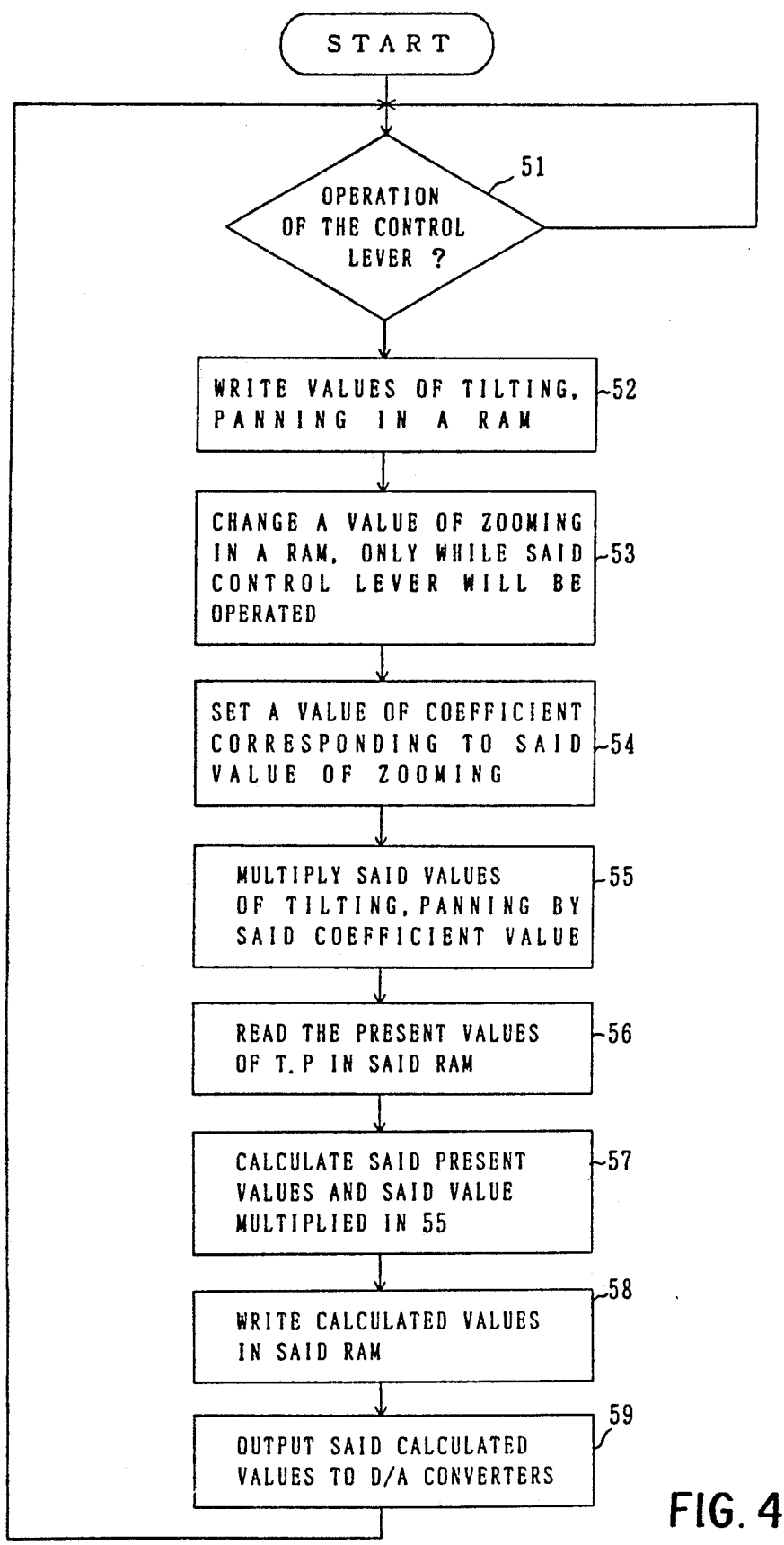
FIG. 4 is also a functional flow chart of the second embodiment of the present invention.
Figure 5:
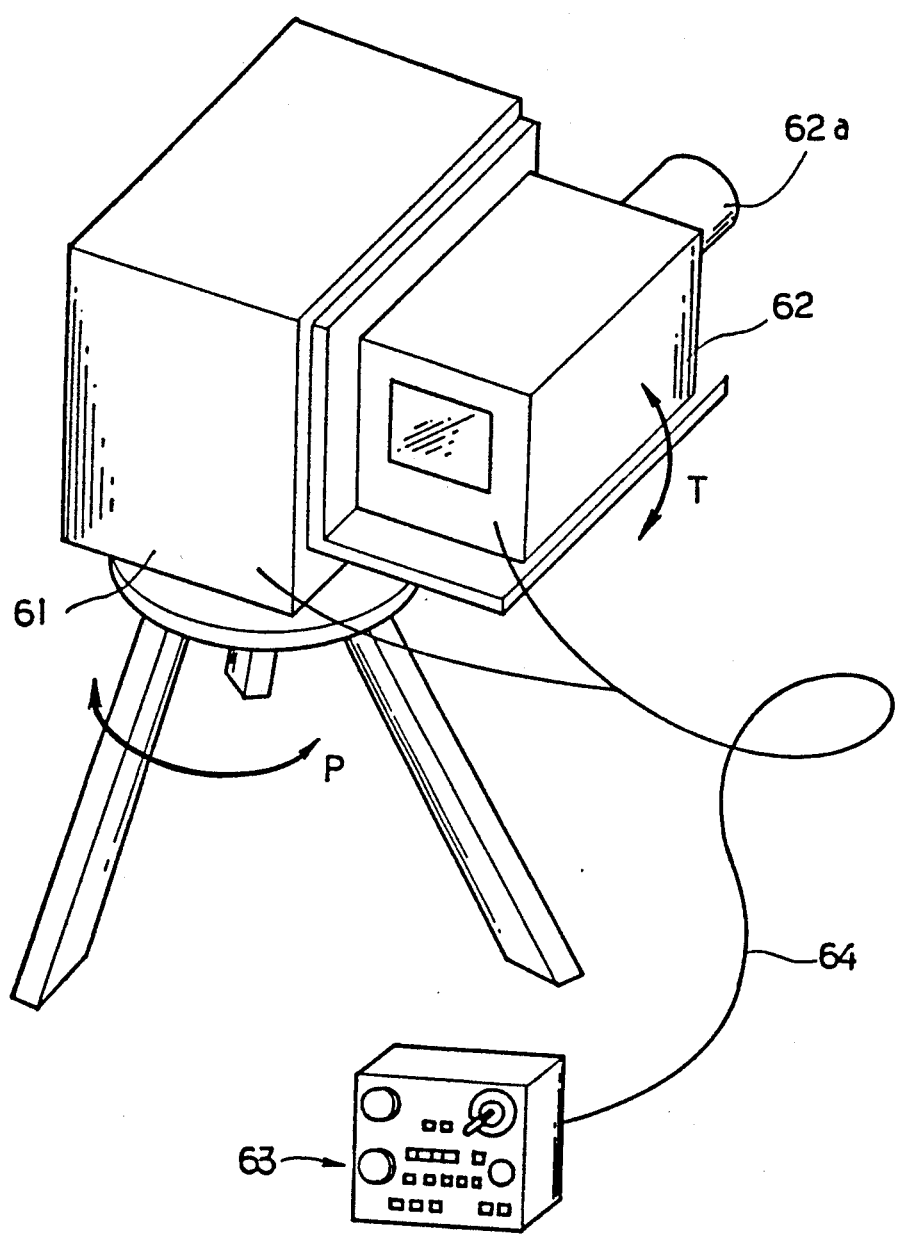
FIG. 5 is a perspective view generally illustrating the configuration of the first embodiment of the present invention.

FIG. 4 is a functional flow chart showing the operations of the second embodiment of the TV camera controller according to the present invention. The second embodiment is quite same as the first embodiment having been described in the foregoing, except for the motion control program stored in the ROM 28.

Also in this second embodiment of the TV camera controller according to the present invention, the steps of operation up to write of an output voltage from zooming potentiometer 24b into the CPU 29 (step 53) are the same as those in the aforementioned first embodiment. The difference of the second embodiment from the first embodiment lies in that the time interval for calculation is fixed while the calculated value is changed. Namely, in the second embodiment, a value of coefficient corresponding to the value of zooming is read from the RAM 30 at step 54, the value of adjustment of the control lever 23 is multiplied with this value of coefficient at step 55, and the result of this multiplication is added to or subtracted from the present value at step 57.

Thus, by multiplying the value of adjustment of the control lever 23 with a small value of coefficient in case a zoom-up is made for example, the panning head 61 will be changed in orientation only a small amount even with a same value of adjustment of the control lever 23, so that the panning head 61 will be moved slowly.

Since the other operations are the same as those in the first embodiment, they will not be explained any more.

Note that the F, Z, P and T motions have been described in the foregoing; however, with vertical and horizontal movements of the TV camera included in addition, a more effective TV camera controller can be provided.

What is claimed is:

1. A system for controlling the aiming direction, focus, zooming and/or position of a television camera, comprising:

a control box having a plurality of control switches and a microcomputer;

a first means for changing the vertical and horizontal direction of a panning head on which a television camera is mounted and the focal distance of said television camera in response to operation of predetermined control switches provided in said control box and for writing values of adjustment resulting from these changes into said microcomputer;

a second means for setting a value of zooming of said television camera by operation of a predetermined control switch provided on said control box and writing a value of adjustment resulted from this setting into said microcomputer;

a speed setting means for modifying said values of adjustment at which the vertical and horizontal orientations of the panning head and the focal distance of said television camera are to be adjusted by said first means, depending upon the value of adjustment obtained by setting said value of zooming;

a means for controlling a zooming servo-mechanism of said television camera by delivering from said microcomputer a control signal corresponding to the value of zooming set with said second means and for controlling a tilting servo-mechanism and panning servo-mechanism of said panning head as well as a focusing servo-mechanism of said television camera with a control signal from said speed setting means; and a means for transmitting control signals between the driving mechanisms provided for said panning head and television camera, respectively, and the control box.

2. A system for controlling the aiming direction, focus, zooming and/or position of a television camera according to claim 1, further comprising:

a third means for controlling the vertical and horizontal position of said panning head on which said television camera is mounted; and;

a means for controlling the driving mechanisms for said third means.

* * * * *